US 7,424,646 B2

(12) United States Patent
Smith

(10) Patent No.: US 7,424,646 B2
(45) Date of Patent: Sep. 9, 2008

(54) IMPOSING A LOGICAL STRUCTURE ON AN UNSTRUCTURED TRACE RECORD FOR TRACE ANALYSIS

(75) Inventor: Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/999,452

(22) Filed: Nov. 30, 2004

(65) Prior Publication Data

US 2006/0129871 A1   Jun. 15, 2006

(51) Int. Cl.
*G06F 11/00*   (2006.01)
(52) U.S. Cl. .................. 714/45; 707/104.1; 717/128
(58) Field of Classification Search ............... 717/129, 717/130; 707/3–6
See application file for complete search history.

(56) References Cited

U.S. PATENT DOCUMENTS

| | | | |
|---|---|---|---|
| 6,339,775 B1 * | 1/2002 | Zamanian et al. | 707/101 |
| 6,470,349 B1 * | 10/2002 | Heninger et al. | 707/102 |
| 6,618,040 B1 | 9/2003 | Mattaway et al. | 345/173 |
| 7,200,588 B1 * | 4/2007 | Srivastava et al. | 707/3 |
| 2003/0088853 A1 | 5/2003 | Iida et al. | 717/128 |
| 2005/0050040 A1 * | 3/2005 | Theobald et al. | 707/4 |

OTHER PUBLICATIONS

G. H. Hjaltason and H. Samet, "Index-Driven Similarity Search in Metric Spaces", ACM Transactions on Database Systems, vol. 28 No. 4, Dec. 2003, pp. 517-526.
Y. Zhang and R. Gupta, "Path Matching in Comopressed Control Flow Traces", Data Compresseion Conference, 2002 IEEE.

* cited by examiner

*Primary Examiner*—Gabriel L Chu
(74) *Attorney, Agent, or Firm*—Kunzler & McKenzie

(57) ABSTRACT

An apparatus, system, and method are disclosed for analyzing trace data that facilitates the analysis by minimizing extraneous results presented to a user. The apparatus includes a user interface to define a query expression based on a condition and one or more parameters and to display a report of trace entries satisfying the query expression. A record handler retrieves an unstructured trace record from a storage device or database. A structuring module divides the unstructured trace record logically into two or more trace entries based on structural information. A comparison module applies the query expression to each entry. This application of the query expression may include further sub-dividing the entry logically to search on a sub-entry level. The comparison module assembles entries satisfying the query expression into an abridged trace record. A report engine combines the abridged trace records into a report of trace entries satisfying the query expression.

20 Claims, 6 Drawing Sheets

IMPOSING A LOGICAL STRUCTURE ON AN UNSTRUCTURED TRACE RECORD FOR TRACE ANALYSIS

BACKGROUND OF THE INVENTION

1. Field of the Invention

This invention relates to trace data and more particularly relates to retrieving trace data based on a query expression.

2. Description of the Related Art

Computer software generally includes a trace feature that may be used during development or during normal operation of a software application. The trace feature causes the software application to report various types of information regarding the inputs received, outputs generated, functions called, return codes received, and other highly detailed information known herein as trace data. Generally, trace data is analyzed by software engineers or programmers to facilitate resolving software bugs and/or inefficiencies in the software application. Typically, trace data can be produced at various levels of granularity. The lower the level of granularity, the more clues the trace data provides for tracking down software errors.

However, a low level of granularity also produces very large quantities of trace data. In certain software, trace data may be produced for each line of code executed. For each software event traced, a trace entry is typically generated. The trace entry is typically relatively small and provides information about the operation being performed as well as context information such as inputs, outputs, and other state information.

Trace data is typically stored for subsequent analysis after the software application is executed to generate the software error. Because trace data is generally only collected during high workload periods for the computer system and/or software application, it is desirable that the tracing operation add minimal overhead to the workload. Consequently, the frequently-generated trace entries are typically combined into larger groups of trace entries, known herein as trace records. The trace records often include a header that identifies the number of trace entries contained therein as well as other context information such as trace type and a timestamp. Trace records can be over one hundred times larger than individual trace entries. Storing the larger trace records requires less I/O than storing individual trace entries.

Trace data can be collected during a single execution or over a period of time in order to identify more latent software bugs. Consequently, the size of the trace data grows dramatically. Analyzing such high quantities of trace data has been difficult for programmers, in particular, where the trace data is formatted and presented in a text format for values such as hexadecimal. The trace data can include few, if any, queues for a programmer such as keywords. With the complexities of modem software and the high quantities of trace data, the debugging task becomes the proverbial search for a needle in a haystack.

Storing trace records optimizes writing to the storage devices, but makes reviewing and analysis extremely difficult. In particular, search utilities currently available such as DFSERA10 and DFSERA70 provided with the Information Management System (IMS) from IBM of Armonk, N.Y., do not permit searching for a data value within trace entries individually. Instead, the whole trace record is treated as a continuous, unstructured record. These conventional tools search trace records for any occurrence of the search string or data value. Consequently, conventional search tools find matching data values, also known as "hits," at various locations within a trace record. Unfortunately, these hits cross boundaries between trace entries, boundaries within trace entries, or occur at the wrong location within a trace entry such that the hits are coincidental and of no use to the programmer. Such hits are false positives.

False positives are particularly problematic in trace systems where the trace data is stored without a large alphabet and/or complex grammar. Consequently, false positives occur more frequently in trace data comprised of, for example, hexadecimal characters versus trace data having alphanumeric characters and/or words.

In addition, conventional search tools retrieve and present each trace record that includes at least one hit. Typically, this means that a high number of non-matching trace entries, as many as one-hundred and twenty-two, or more are presented with the one or two trace entries containing the hit. Storing, printing, displaying, and sifting through the non-matching trace entries together with the actual hit trace entries can be tedious and labor intensive for programmers concentrating on tracking down a software problem. The non-matching trace entries make the results difficult to read and can interfere with a programmer's concentration. Furthermore, if the hit is a false positive, the processing of these trace records is wasted. In some instances, millions of lines of output are returned, the majority of which are extraneous.

From the foregoing discussion, it should be apparent that a need exists for an apparatus, system, and method for searching trace data on the trace entry and trace sub-entry level in addition to the trace record level. The apparatus, system, and method should minimize false positives and the size of search results to ease storage requirements and trace data analysis time.

SUMMARY OF THE INVENTION

The present invention has been developed in response to the present state of the art, and in particular, in response to the problems and needs in the art that have not yet been fully solved by currently available trace data analysis methods. Accordingly, the present invention has been developed to provide an apparatus, system, and method for analyzing trace data that overcome many or all of the above-discussed shortcomings in the art.

The apparatus for analyzing trace data is provided with a logic unit containing a plurality of modules configured to functionally execute the steps of analyzing trace data. These modules in the described embodiments include a record handler, a structuring module, and a comparison module.

The record handler retrieves an unstructured trace record from a storage device. The unstructured trace record includes no trace entry delimiters, field or column identifiers, or other features that provide structural references within the record.

The structuring module divides the unstructured trace record logically into two or more trace entries. In one embodiment, the structuring module is hard-coded with structural information that defines the internal structure of the trace record, trace entries, and/or sub-entries. Alternatively, the structural information is provided by one or more parameters of a query expression provided to the apparatus. The comparison module applies the query expression to each entry and assembles each entry that satisfies the query expression into an abridged trace record. The comparison module outputs the abridged trace records.

A system of the present invention is also presented for analyzing trace data. The system may include the modules of the apparatus. In addition, the system, in one embodiment, includes a processor, a storage device, Input/Output (I/O)

devices, a communication bus, and a memory. The processor executes software to mange operations of the system. The storage device stores a plurality of unstructured trace records. The I/O devices interact with a user. The communication bus operatively couples the processor, storage device, I/O devices, and memory.

The memory may include the record handler, structuring module, and comparison module discussed above. In addition, the memory includes a user interface and a report engine. The user interface defines the query expression and displays a report of trace entries satisfying the query expression. The query expression may include a condition and one or more parameters. A user may provide the query expression using the I/O devices. The report engine receives abridged trace records from the comparison module. In one embodiment, the report engine combines one or more abridged trace records into a report of trace entries that satisfy the query expression. The report engine may store the report on the storage device or present the report to the user using the I/O devices.

A method for deploying computing infrastructure capable of analyzing trace data is provided. The method in the disclosed embodiments substantially includes the steps necessary to carry out the functions presented above with respect to the operation of the described apparatus and system. The computing infrastructure divides the unstructured trace record logically into two or more trace entries. Next, a query expression comprising a condition and one or more parameters is applied to each entry. Entries that satisfy the query expression are assembled into one or more abridged trace records. The one or more abridged trace records are presented to the user.

The apparatus, system, and method searches trace data on the trace entry and trace sub-entry level in addition to the trace record level. The apparatus, system, and method minimizes false positives and separates trace entries having matches from extraneous trace entries to reduce the size of search results. Smaller search results ease storage requirements and trace data analysis time. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
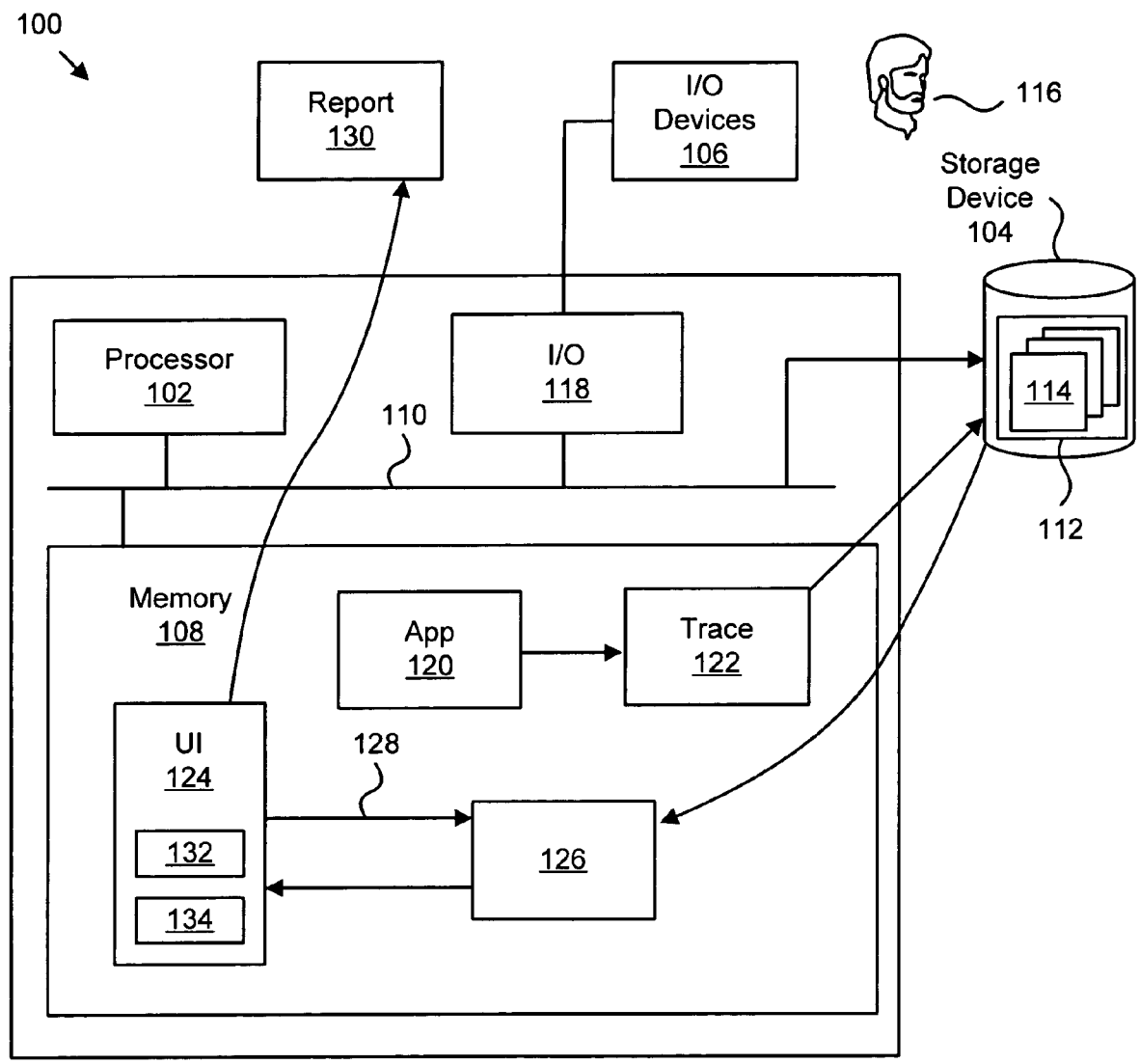
FIG. 1 is a block diagram illustrating one embodiment of a system for analyzing trace data in accordance with the present invention.

FIG. 1 illustrates one embodiment of a system 100 for analyzing trace data. The system 100 includes a processor 102, a storage device 104, I/O devices 106, a memory 108, and a communication bus 110. Those of skill in the art recognize that the system 100 may be more simple or complex than illustrated so long as the system 100 includes modules or sub-systems that correspond to those described herein. In one embodiment, the system 100 comprises hardware and/or software more commonly referred to as a Multiple Virtual Storage (MVS), OS/390, zSeries/Operating System (z/OS), UNIX, Linux, or Windows system 100.

Typically, the processor 102 comprises one or more central processing units executing software and/or firmware to control and manage the other components within the system 100. The storage device 104 provides persistent storage of data. In particular, the storage device 104 stores one or more data sets 112. Each data set 112 preferably includes a plurality of records 114, for example trace records 114.

The I/O devices 106 permit a user 116 to interface with the system 100. In one embodiment, the user 116 provides a query expression. Alternatively, query expressions may be stored in a script, software code, or the like. The I/O devices 106 include standard devices such as a keyboard, monitor, mouse, and the like. I/O devices 106 are coupled to the communication bus 110 via one or more I/O controllers 118 that manage data flow between the components of the system 100 and the I/O devices 106.

The communication bus 110 operatively couples the processor 102, memory 108, I/O controllers 118, and storage device 104. The communication bus 110 may implement a variety of communication protocols including Peripheral Communication Interface, Small Computer System Interface, and the like.

The memory 108 may include an application 120, a trace module 122, a User Interface (UI) 124 and a query module 126. The application 120 may comprise any software application configured to interface with the trace module 122. For example, the application may comprise a transaction and database management system such as Information Management System (IMS) from IBM.

The trace module 122 comprises a software module configured to monitor the application 120 and generate trace entries representative of certain operations, data, and events that occur in relation to the application 120. The trace module 122 is further configured to minimize I/O overhead in the system 100 by bundling a plurality of trace entries into an unstructured trace record 114 that the trace module 122 stores in trace data sets 112. The trace module 122 may be integrated with or separate from the application 120.

When a user 116 desires to analyze a trace data set 112, the user 116 defines a query expression 128 within the UI 124. Rather than just a simple search string as in conventional systems, the query expression 128 comprises a condition and one or more parameters. The condition and parameters permit the user 116 more control over the search results and are explained in more detail below.

The UI 124 may comprise a command line interface, an entry panel-driven interface, a Graphical User Interface (GUI), a batch interface, or a combination of these. The user 116 enters predefined commands, operators, and data values into the UI 124 to define the query expression 128. Preferably, the UI 124 checks user input to ensure that syntax and semantics rules are satisfied.

The UI 124 provides the query expression 128 to the query module 126. In one embodiment, based on the parameters, the query module 126 retrieves all the trace records 114 for a particular trace data set 112. The query module 126 applies the condition to each entry within the trace records 114. Trace entries that satisfy the condition are collected into one or more abridged trace records and trace entries that fail to satisfy the condition are discarded.

The query module 126 may provide the abridged trace records to the UI 124 in the form of a report 130. Alternatively, the query module 126 may provide the abridged trace records to the UI 124 in a raw unformatted condition such that the UI 124 may format the abridged trace records. The UI 124 displays the report 130 to the user 116, for example, on a monitor 106. In one embodiment, the report 130 may include exclusively trace entries that satisfy the condition of the query expression 128. Alternatively, the UI 124 may present the report 130 in other formats and/or on other devices 106. For example, the report 130 may be stored on the storage device 104, printed on paper, or the like.

To facilitate review and analysis of the report 130, the UI 124 may include a first analysis aide 132 and a second analysis aide 134. Preferably, the report 130 is formatted and organized to optimize the review of the trace entries contained therein. The first analysis aide 132 is configured to highlight portions of trace entries in the report 130 that satisfy the condition of the query expression 128. Highlighting may be accomplished using underlining, flashing text, different text color, background colors for the text, an inverse contrast display of the text, positioning of a cursor, or the like.

Although the query module 126 dramatically reduces the number of trace entries in the report 130, the report 130 may still take several screens to present to a user 116. The second analysis aide 134 permits a user 116 to navigate between trace entries in the report 130. In one embodiment, the second analysis aide 134 comprises a set of display screen navigation buttons or hot keys. The display screen navigation buttons permit the user 116 to quickly move between screens displaying portions of the report 130. Alternatively, or in addition, the second analysis aide 134 may comprise a set of "hit" navigation buttons or hot keys that permit the user 116 to quick display a specific portion of the trace entry that includes the hit. In one embodiment, the UI 124 includes a sort feature that allows the user 116 to sort trace entries in the report 130 according to criteria such as a timestamp or sequentially based on a specific logical sub-entry within the entries.

Figure 2:
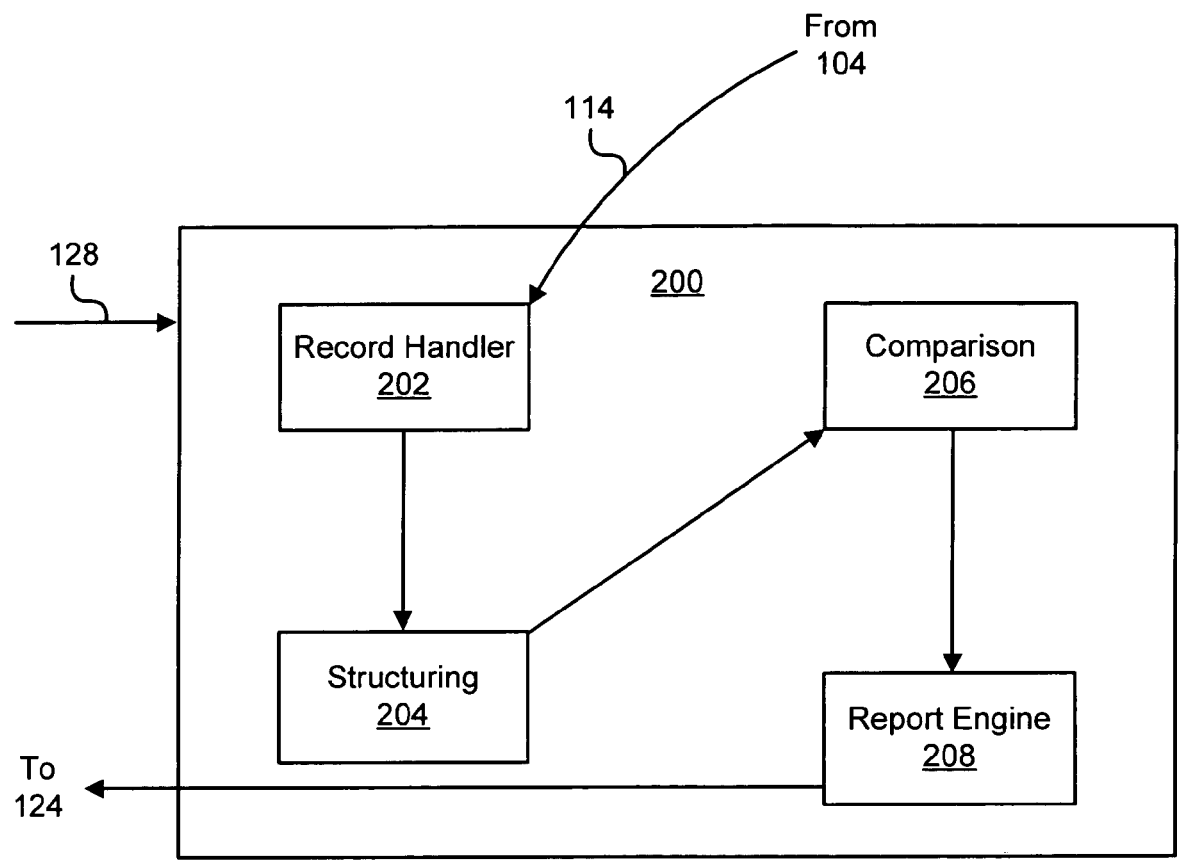
FIG. 2 is a block diagram illustrating one embodiment of an apparatus for analyzing trace data in accordance with the present invention.

FIG. 2 illustrates one embodiment of a query module 200. Preferably, the query module 200 is configured to serve as the query module 126 described in relation to FIG. 1. The query module 200 includes a record handler 202, a structuring module 204, a comparison module 206, and a report engine 208. The record handler 202 retrieves one or more unstructured trace records 114 from the storage device 104. In certain embodiments, the record handler 202 accesses one or more sets of trace records 114 in the storage device 104. Alternatively, the storage device 104 includes a single set of trace records 114. The record handler 202 may distinguish between sets of trace records 114 using a trace data set indicator. The trace data set indicator may be provided by a user as one of the parameters of a query expression 128 or may be hardcoded within the query module 200.

Preferably, the record handler 202 retrieves a plurality of trace records 114 at a time to minimize the I/O requests. Alternatively, the record handler 202 may retrieve each trace record 114 individually. The record handler 202 preferably passes one trace record 114 at a time to the structuring module 204.

The structuring module 204 serves to imposes a logical structure on the unstructured trace record 114. The structure imposed may not be defined in the trace record 114 itself. The structuring module 204 may use structural information to define a logical structure for the trace record 114. The structuring module 204 divides the unstructured trace record 114 logically into two or more trace entries based on the logical structure defined by the structural information. Optionally, the structuring module 204 divides the unstructured trace record 114 logically into a single trace entry based on the logical structure defined by the structural information.

In one embodiment, the structuring module 204 retains the trace record 114 intact and associates the logical structure with the comparison module 206 such that query expressions 128 are applied within the logical structure. In another embodiment, the structuring module 204 defines a temporary structure sized to hold a copy of a trace entry. The structuring module 204 may define a temporary structure for each trace entry within a trace record 114. The temporary structure may also include fields identifying particular sub-entries within a trace entry. In yet another embodiment, the structuring module 204 physically divides the unstructured trace record 114 into a plurality of trace entries.

The structuring module 204 and comparison module 206 may cooperate to apply the query expression 128 to each entry of the trace record 114. In one embodiment, the structuring module 204 sends each trace entry to the comparison module 206. The trace entries may be sent as data structures divided from the trace record 114 or temporary structures holding copies of trace entry data. Alternatively, the structuring module 204 defines rules that control how the comparison module 206 applies the query expression 128. The rules may be defined by the structural information and may impose a logical structure on the unstructured trace record 114.

In another embodiment, the structuring module 204 dictates how the unstructured trace record 114 is parsed and traversed for application of the query expression 128. In this embodiment, the structuring module 204 may perform loop processing of the trace record 114. Each pass through the loop may examine a subsequent trace entry based on a length and/or size defined in the structural information. On each pass, the structuring module 204 may call the comparison module 206 to apply the query expression 128 to a trace entry.

In certain embodiments, the comparison module 206 includes a parser configured to further parse each trace entry into sub-entries. The sub-entries may be parsed out according to one or more parameters provided with, or as part of, the query expression 128. Once a sub-entry is parsed out, the comparison module 206 may apply a condition of the query expression 128 to the sub-entry. In this manner, the query module 200 is capable of applying conditions at a trace entry level and trace sub-entry level. This finer level of control in applying conditions limits extraneous "hits" because coincidental matches that cross boundaries between entries and sub-entries will not be registered as hits.

The comparison module 206 is configured to assemble each trace entry that satisfies the query expression 128 into an abridged trace record. Typically, the abridged trace record holds fewer trace entries than a trace record 114. However, where every trace entry of a trace record 114 comprises a "hit," the number of trace entries in an abridged trace record may agree with the number of trace entries in the corresponding trace record 114. Preferably, the format and sizes of abridged trace records are consistent with those for trace records 114. In this manner, the query module 200 can process the abridged trace records using the same tools and utilities used with trace records 114.

In one embodiment, the report engine 208 is the same report engine that was conventionally used to process trace records 114. In accordance with the present invention, the report engine 208 now processes abridged trace records. The report engine 208 combines one or more abridged trace records into a report of trace entries that satisfy the query expression 128. Preferably, the report is in the same format and configuration as conventional reports that included extraneous trace entries. The difference being that the report produced by the report engine 208 now includes few, if any, extraneous trace entries. In this manner, the report retains the same look and feel, but provides more relevant results for programmers to review. The report engine 208 may provide the report to the UI 124. In certain embodiments, the report engine 208 comprises conventional utilities such as DFSERA60 for IMS and the like.

Figure 3:
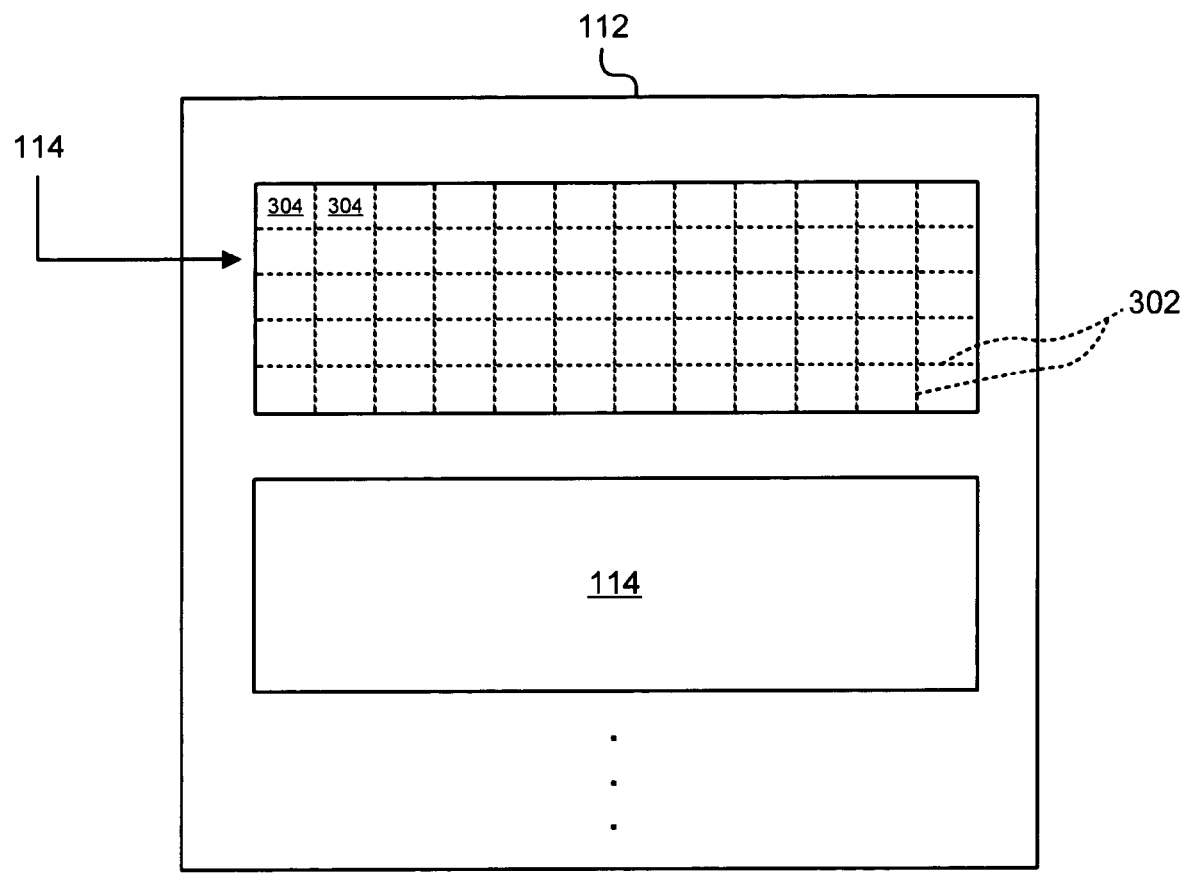
FIG. 3 is a block diagram illustrating a trace data set comprising a plurality of trace records suitable for use with the present invention.

FIG. 3 illustrates a trace data set 112 comprising a plurality of trace records 114 suitable for use with the query module 200. Conventionally, as mentioned above, to optimize I/O when trace data sets 112 are generated, a plurality of trace entries are written to the storage device 104 grouped within a single trace record 114. One of skill in the art will note that the trace records 114 include no structuring. There are no columns, fields, offsets, or other structural information stored with the trace record 114. To the storage device 104 and conventional search utilities, the trace record 114 is a contiguous set of unstructured data. Consequently, conventional utilities searched for hits sequentially through a trace record 114. This leads to the extraneous and coincidental hits described above.

In contrast, the present invention using, for example, the query module 200 imposes a logical structure 302 (represented by the dashed lines) on unstructured trace records 114. The logical structure 302 is then used by the query module 200 to apply conditions at a finer level of granularity than was possible with unstructured trace records 114. In certain embodiments, the logical structure 302 divides the unstructured trace record 114 into a plurality of trace entries 304. Preferably, the unstructured trace record 114 divides evenly into a plurality of trace entries 304.

In a preferred embodiment, the trace record 114 is logically divided into trace entries 304. Alternatively, the trace record 114 is physically divided into trace entries 304. As used herein, logical division of the unstructured trace record 114 means that the trace record 114 is processed in such a manner that trace entries 304 and/or trace sub-entries are independently identified for application of a query expression condition. Those of skill in the art will recognize that, in addition to the examples provided herein, there are a variety of ways to implement logical division of the unstructured trace record 114.

Logical structuring of unstructured trace records 114 provides several advantages. First, logical structuring retains the benefits of minimized I/O overhead when trace entries 304 are initially stored on the storage device 104. Second, logical structuring requires no changes to the trace entry storage routines, to the storage format for trace entries, or to the storage requirements for the storage device 104.

In certain embodiments, a trace record 114 includes trace entries 304 that are grouped together based on common characteristics such as time, trace type, original trace application, and the like. The trace record 114 may hold up to a maximum number of trace entries 304. In one embodiment, a trace record 114 holds up to 122 trace entries 304.

Figure 4:
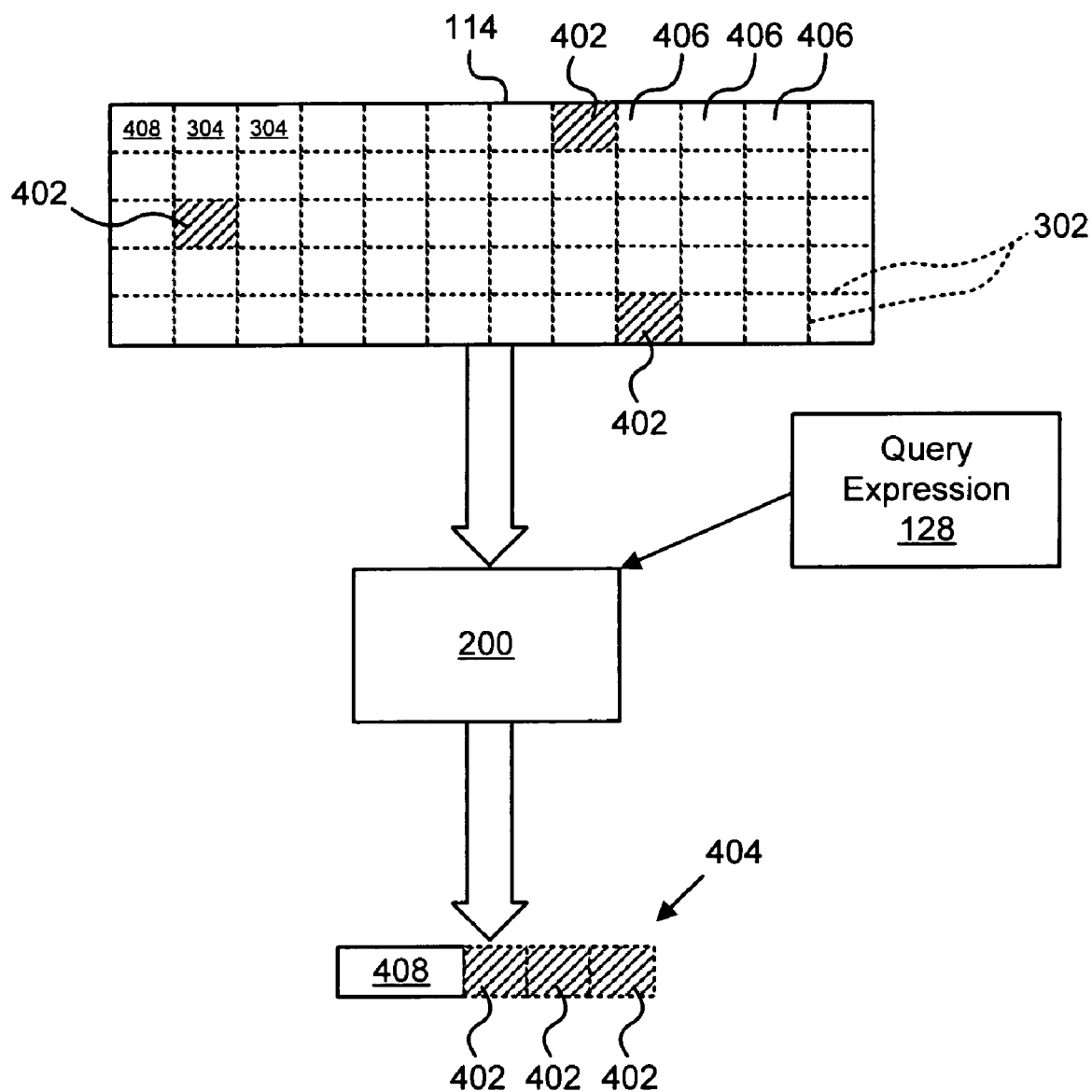
FIG. 4 is a block diagram illustrating logically the operation of one embodiment of an apparatus for analyzing trace data in accordance with the present invention.

FIG. 4 illustrates the operation of the present invention on an unstructured trace record 114. The present invention significantly reduces an unstructured trace record 114 having at least one hit to just the trace entries 402 satisfying the query expression 128. Initially, the unstructured trace record 114 is divided logically into a plurality of trace entries 304.

The logical structure 302 is based on structural information. The structural information defines the layout of the trace record 114 as well as the layout of individual trace entries 304 within the trace record 114. In one embodiment, a majority of the structural information is programmatically defined, or "hardcoded," within the query module 200. Such structural information may comprise a fixed size for trace entries 304, a data type for data values in the trace entries 304, a fixed size for sub-entries within trace entries 304, field sizes, field names, and the like. The fixed trace entry and sub-entry sizes may also be variable sizes. Other structural information such as a count for the number of trace entries 304 and/or sub-entries within a trace record 114 may come, respectively, from a header for the trace record 114 and/or a header for the sub-entry.

Subsequently, the query module 200 applies a query expression 128 to each entry 304. Entries 402 that satisfy the condition of the query expression 128 are illustrated using shading. In one embodiment, the query expression 128 comprises a condition and one or more parameters. In certain embodiments the query expression 128 comprises a compound expression made up of two or more query expressions joined by one or more boolean operators. The boolean operators are well known and include operators such as "and," "or," "not," and the like. Preferably, each entry 402 that is a hit satisfies one or more query expressions of a compound query expression. Each query expression in a compound query expression may include a separate set of parameters. Alternatively, one set of parameters may apply to all the query expressions of a compound query expression 128.

Once entries 402 are identified, the query module 200 assembles the entries 402, in one embodiment, into an abridged trace record 404. Preferably, the abridged trace record 404 includes just the "hit" entries 402. Those of skill in the art recognize various ways in which entries 402 can be assembled. A few examples of these are described below.

In one embodiment, the query module 200 extracts each entry 402 from the unstructured record 114. The query module 200 combines the extracted entries 402 into the abridged record 404. The query module 200 may discard the remainder of the trace record 114. Typically, entries 402 are located in an unstructured record 114 based on some order such as a time sequence. The query module 200 preferably preserves this ordering when entries 402 are combined to form the abridged trace record 404.

Alternatively, the query module 200 assembles trace entries 402 by removing entries 406 (non-shaded) that fail to satisfy the query expression 128. Once all such entries 406 are removed, the query module 200 may re-characterize the trace record 114 as an abridged record 404. In this manner, memory storing a trace record 114 may be optimally reused.

The abridged trace record 404 is then presented to the user. In one embodiment, the abridged record 404 includes a header 408. The query module 200 may incorporate a header 408 for the unstructured trace record 114 with the entries 402 that satisfy the query expression 128. In certain embodiments, the header 408 may be modified. For example, a count indicator that identifies the number of entries 402 in an abridged record 404 may be adjusted down to reflect that entries 406 failing to satisfy the query expression 128 have been removed or at least not included.

In one embodiment, the abridged record 404 includes just trace entries 402 and the header 408 from a single trace record 114. This may be advantageous as the header 408 included with the abridged record 404 may include other information such as timestamps, trace type information, and the like that is useful in utilizing the trace entries 402. Alternatively, the query module 200 may combine trace entries 402 from a plurality of trace records 114 into a single abridged record 404. Consequently, the abridged record 404 may include a header 408 that indicates which trace records 114 the entries 402 originated from.

Figure 5:
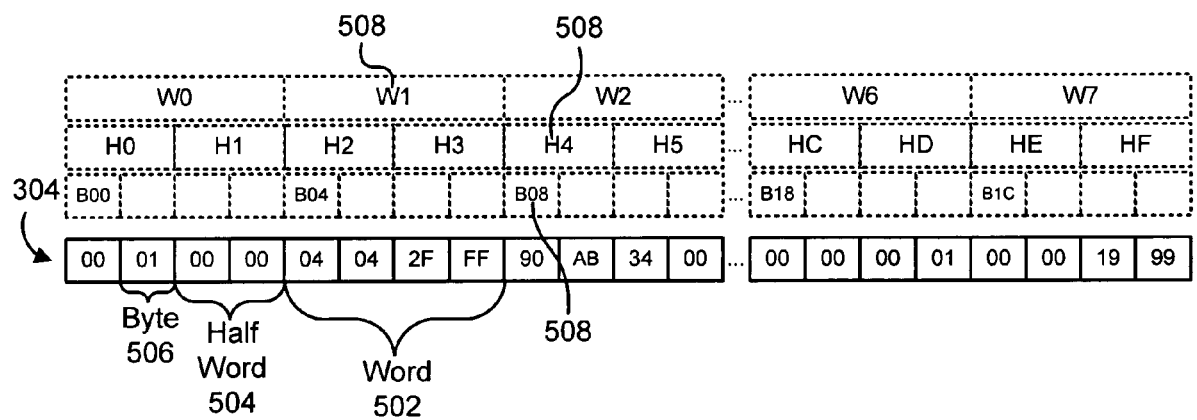
FIG. 5 is a block diagram illustrating logical structuring of a trace entry suitable for use with one embodiment of an apparatus in accordance with the present invention.

FIG. 5 illustrates a representative example of a trace entry 304 that the present invention logically defines in the unstructured trace record 114 illustrated in FIG. 3. In one embodiment, a trace entry 304 is comprised of eight equal sized sub-entries herein referred to as words 502. Each word 502 is comprises of two equal size half words 504. Each half word 504 is comprised of two equal size bytes 506. Preferably, a byte 506 comprises eight bits.

As discussed above, the query module 200 is configured to apply a condition of a query expression 128 to a trace entry 304 or to sub-entries of each trace entry 304. The condition comprises at least an operator, and a query data value. An example condition may be: "W=00000001." The query data value is "00000001" and the operator is "=." Another operator supported may include "<>." The "W" may comprise a parameter referred to herein as a boundary indicator. The boundary indicator corresponds to one type of sub-entry 502, 504, 506 that the entry 304 can be sub-divided into. Preferably, the boundary indicator 502, 504, 506 is included in the condition. Alternatively, the boundary indicator 502, 504, 506 is a separate parameter. Of course, various parameters may be provided separately or integrated with a condition.

The boundary indicator 502, 504, 506 comprises one form of structural information. Structural information may be provided in the form of an offset into a trace record 114, a start position and a field identifier, a position and a length, or the like. Those of skill in the art recognize a variety of ways to structure an unstructured set of sequential data logically. All such ways are considered within the scope of the present invention.

The example condition may be interpreted by the query module 200 to mean: search each word 502 of the entry 304 searching for a word size match between data value "00000001" and a data value in the entry 304. Preferably, the data values are hexadecimal values in which eight Extended Binary Coded Decimal Interchange Code (EBCDIC) character values comprise a word 502.

Based on this example condition, the comparison module 206, for example, may divide (illustrated by the dashed lines) the entry 304 into a plurality of words 502, i.e., W0, W1, W2, . . . W7. Once again, this division is preferably a logical division of the entry 304. Next, the comparison module 206 compares the data value "00000001" to the data value of each word 502. If a match is found, such as the sixth word 502 (W6), the entry 304 is identified as a hit. Preferably, the query module 200 is configured to similarly logically divide the entry 304 to search based on a half word 504 or byte 506 type of boundary indicator 502, 504, 506. The boundary indicator 502, 504, 506 permits a user to provide a more specific condition which prevents matches across sub-entry boundaries that conventional search utilities typically erroneously identify as hits.

In certain embodiments, the parameters may include a logical field indicator 508. The logical field indicator 508 is an indicator of a logical field of the entry 304. The logical field is based on a logical sub-entry division of the entry 304. Preferably, the logical field indicator 508 indicates the sub-entry and the offset into the entry 304 for a particular, sequentially numbered sub-entry. Alternatively, the logical field indicator 508 comprises just the offset or sequence number. The offset may be represented using hexadecimal values as well. For example, a logical field indicator 508 of "B08" refers to the ninth byte in the entry 304. A user may define the condition to include a logical field indicator 508 to search a specific location (logical field) within an entry 304.

For example, the query module 200 would select entry 304 of FIG. 5 if the condition stated "B08=90." Consequently, the comparison module 206, for example, may divide (illustrated by the dashed lines) the entry 304 into a plurality of bytes 506, i.e., B00, B01, B02, . . . B1F. Once again, this division is preferably a logical division of the entry 304. Next, the comparison module 206 compares the data value "90" to the data value of byte B08. The logical field indicator 508 permits a user to provide a more specific condition that searches in a specific logical field of an entry 304. This further prevents matches in other fields that conventional search utilities would erroneously identify as hits.

Advantageously, the query module 200 permits a user to search individual trace entries, sub-entries within trace entries, and specific sub-entries within trace entries. In certain instances, a user may desire to search for data values that extend across sub-entry boundaries. The query module 200 accommodates this need by permitting a user to provide a compound query expression 128, as described above. Preferably, the compound query expression 128 includes a first query expression to identify a part of the data value on one side of a boundary and a second query expression to identify a part of the data value on the other side of the sub-entry boundary.

Preferably, the query module 200 is configured to parse an entry 304 based on a plurality of query expressions that together form a compound query expression 128. An example compound query expression may state "W6=00000001 AND H0=0001." Consequently, the comparison module 206 may logically divide the entry into word 502 sub-entries for the first query expression "W6=00000001" and into half word 504 sub-entries for the second query expression "H0=0001." Based on the "AND" operator, the comparison module 206 may require that both the first query expression and the second query expression be satisfied before the entry 304 is identified as a hit. Of course, the compound query expression may include more than two query expressions.

In certain embodiments, the operator may be binary as with "AND " and "OR" or unary such as "NOT." The operator may be included in the query expression 128 as a word or a symbol. Alternatively, the UI 124 may control how boolean operators are designated. For example, a first query expression on the same line as a second query expression and separated by a space may indicate an "AND" operator. Similarly, a first query expression on a first line and a second query expression on a separate line may indicate an "OR" operator. Preferably, the UI 124 also validates the query expressions 128 for proper syntax. If the syntax is not correct, the UI 124 may indicate an error.

In certain embodiments, the parameters include a wild card indicator. The wild card indicator may comprise the "*" symbol in combination with a boundary indicator 502, 504, 506 such as "W" for word 502, "H" for half word 504, "B" for byte 506. An example query expression 128 may be "W*=00000001." Such a query expression 128 searches for the data value in each word where "W6=00000001" searches just in the seventh word 502.

Various other parameters may be included in the query expression 128. The parameters may be integrated and combined or separately identified by position and or other indicators. In one embodiment, a trace data set indicator may comprise a name of the trace data set 112 of interest. A time range indicator may define a time range for the trace records 114 that are to be considered for matches to the condition. The query module 200 may reference the header 408 of trace records 114 to filter based on the time range. The time range may include a timestamp and an operator such as ">=," "<=," and the like.

In certain trace records 114, trace entries immediately preceding and immediately following a trace entry 304 of interest can offer clues about a potential software error. Consequently, in certain embodiments, the user provides a context indicator, i.e., 5, comprising a numerical value representative of the number of trace entries 304 before and after a hit the user desires to have included in the abridged record 404 and thus in the report 130. The comparison module 206 may reference the context indicator when assembling the trace entries 402. In this manner, the report 130 can include trace entries 304 that may provide some context for the trace entry 402 of interest.

Figure 6:
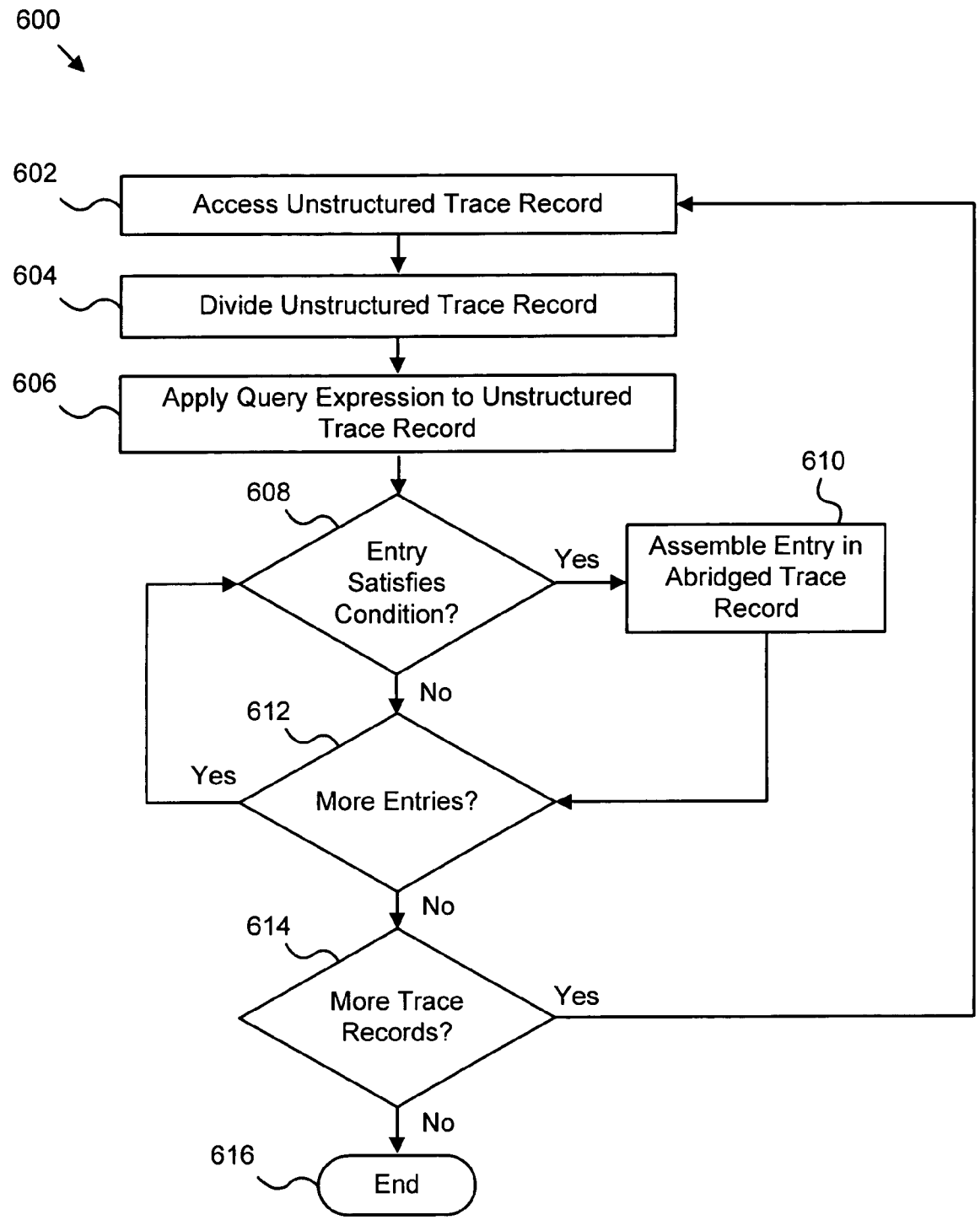
FIG. 6 is a flow chart diagram illustrating one embodiment of a method for analyzing trace data in accordance with the present invention.

FIG. 6 is flow chart diagram illustrating one embodiment of a method 600 for analyzing trace data in accordance with the present invention. Preferably, the method 600 can be implemented in a conventional system by modifying computer readable code in order to implement the query module 126 described above. The method 600 is initiated when a user desires to review trace entries that satisfy a condition. Initially, a user defines one or more conditions and one or more parameters. In certain embodiments, the parameters includes a trace data set indicator that names a trace data set 112 of interest to the user. The UI 124 validates the query expression 128.

Once a user provides a valid query expression 128, the record handler 202 accesses 602 at least one unstructured trace record 114. In certain embodiments, the record handler 202 may access 602 a subset of trace records 114 in a trace data set based on a time range provided as one of the parameters. The structuring module 204 logically divides 604 the unstructured trace record 114 into one or more trace entries 304 based on structural information. Next, the comparison module 206 applies 606 the query expression 128 to each entry 304. In certain embodiments, the comparison module 206 further logically divides each trace entry 304 into sub-entries 502, 504, 506 based on the boundary indicators 502, 504, 506 included in the parameters. Preferably, the comparison module 206 parses and searches the sub-entries according to the boundary indicators.

Next, a determination 608 is made whether an entry 304 satisfies the query expression 128. The query expression may be applied at the entry level, the sub-entry level, or a combination of these. If the entry 304 satisfies the query expression 128, the comparison module 206 assembles 610 the entry 304 in an abridged trace record 404.

If not, a determination 612 is made whether more entries 304 of the trace record 114 exist. This trace record 114 now has a logical structure. If more entries 304 exist, the method 600 returns to step 608 and a subsequent trace entry 304 is evaluated against the query expression 128. The comparison module 206 parses and searches the sub-entries of the subsequent entry 304 as described above.

If no more entries 304 exist, a determination 614 is made whether more unstructured trace records 114 exist. If so, the method 600 returns to step 602 and accesses a subsequent trace record 114. If not, the method 600 ends 616.

The present invention permits searching trace data on a trace entry and a trace sub-entry level in addition to the trace record level. The present invention minimizes false positives and the size of search results to ease storage requirements and minimize trace data analysis time. Furthermore, the present invention permits a user to search based on a specific sub-entry level selected from the group consisting of word, half word, and byte. In addition, the present invention may be integrated with conventional report engines, user interfaces, storage devices, and operating systems. In one embodiment, the present invention may be deployed by replacing a conventional query module with a query module 200 in accordance with the present invention. In this manner, the benefits of the present invention can be realized with minimal changes to existing systems. In addition, the benefits of storing trace entries 304 in unstructured trace records 114 is retained.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as data value programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices;

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

What is claimed is:

1. A computer readable storage medium tangibly embodying a trace data analyzer comprising a program of machine-readable instructions executable by a digital processing apparatus to perform operations to analyze unstructured trace data the operations comprising:

an operation to analyze one or more unstructured trace data records, the unstructured trace data records generated by a plurality of computer applications such that internal structure of the trace data records is unknown to the trace data analyzer;

an operation to divide each unstructured trace record logically, by dynamically imposing a logical structure on each unstructured trace record during run-time of the trace data analyzer to divide the unstructured trace record into two or more trace entries based on structural information, the unstructured trace record logically divided based on a boundary indicator associated with a logical field indicator provided by one or more parameters;

an operation to dynamically apply a query expression comprising a condition and the one or more parameters to each entry;

an operation to assemble each trace entry that satisfies the query expression into an abridged trace record; and an operation to present the abridged trace record to a user.

2. A computer readable storage medium of claim 1, wherein the operation to dynamically apply further comprises an operation to logically divide an entry into one or more sub-entries based on a boundary indicator provided as one of the parameters and an operation to apply the condition to the one or more sub-entries.

3. A computer readable storage medium of claim 1, wherein the operation to dynamically apply further comprises an operation to logically divide an entry into one or more sub-entries based on a boundary indicator associated with a logical field indicator provided as one of the parameters and an operation to apply the condition to the sub-entry associated with the logical field indicator.

4. A computer readable storage medium of claim 1, wherein the operation to apply further comprises an operation to parse an entry into one or more sub-entries based on one or more of the parameters and an operation to apply the condition to the one or more sub-entries.

5. A computer readable storage medium of claim 1, wherein the parameters are selected from the group consisting of a boundary indicator, a logical field indicator, a time range, a wild card indicator, a context indicator, and a trace data set indicator.

6. A computer readable storage medium of claim 1, further comprising an operation to extract one or more entries from the unstructured trace record that satisfy the query expression.

7. A computer readable storage medium of claim 1, wherein the operation to assemble further comprises an operation to remove entries from the trace record that fail to satisfy the query expression and an operation to re-characterize the trace record as an abridged trace record.

8. A computer readable storage medium of claim 1, wherein the operation to assemble further comprises an operation to incorporate a header for the unstructured trace record with the entries satisfying the query expression.

9. A computer readable storage medium of claim 1, wherein the query expression comprises a compound expression of two or more query expressions joined by boolean operators.

10. A computer readable storage medium of claim 1, further comprising an operation to access the unstructured trace record within a set of trace records.

11. A system for analyzing trace data, the system comprising:

a processor;

a storage device comprising a plurality of unstructured trace records;

Input/Output (I/O) devices configured to interact with a user;

a memory comprising, a user interface configured to define a query expression based on a condition and one or more parameters and to display a report of trace entries satisfying the query expression;

a record handler configured to retrieve an unstructured trace record from the storage device;

a trace data analyzer to analyze one or more unstructured trace data records, the unstructured trace data records generated by a plurality of computer applications such that internal structure of the trace data records is unknown to the trace data analyzer;

a structuring module configured to divide the unstructured trace record logically, by dynamically imposing a logical structure on each unstructured trace record during run-time of the trace data analyzer to divide the unstructured trace record into one or more trace entries based on structural information, the unstructured trace record logically divided based on a boundary indicator associated with a logical field indicator provided by one or more parameters;

a comparison module configured to dynamically apply the query expression to each entry and assemble each trace entry that satisfies the query expression into an abridged trace record;

a report engine configured to combine one or more of the abridged trace records into the report of trace entries satisfying the query expression; and a communication bus coupling the processor, storage device, I/O devices, and memory.

12. The system of claim 11, wherein the comparison module comprises a parser configured to parse an entry into one or more sub-entries based on one or more of the parameters such that the comparison module applies the condition to the one or more sub-entries.

13. The system of claim 11, wherein the parameters are selected from the group consisting of a boundary indicator, a logical field indicator, a time range, a wild card indicator, and a trace data set indicator.

14. The system of claim 13, wherein the boundary indicator is selected from the group consisting of a word, a half-word, and a byte.

15. The system of claim 11, wherein the comparison module is configured to further extract one or more entries from the unstructured trace record that satisfy the query expression.

16. The system of claim 11, wherein the comparison module removes entries from the trace record that fail to satisfy the query expression.

17. The system of claim 11, wherein the comparison module incorporates a header for the unstructured trace record with the entries satisfying the query expression.

18. The system of claim 11, wherein the query expression comprises a compound expression of two or more query expressions joined by boolean operators.

19. The system of claim 11, wherein the user interface comprises a first analysis aide configured to highlight portions of trace entries in the report that satisfy the condition and a second analysis aide configured to navigate between trace entries in the report.

20. A method for deploying computing infrastructure, comprising integrating computer readable code into a computing system, wherein the code in combination with the computing system is capable of performing the following:

analyzing one or more unstructured trace data records, the unstructured trace data records generated by a plurality of computer applications such that internal structure of the trace data records is unknown to the trace data analyzer, the unstructured trace data records having no trace entry delimiters, no field identifiers, and no column identifiers, that can provide structural references;

divide each unstructured trace record logically, by dynamically imposing a logical structure on each unstructured trace record during run-time of the trace data analyzer to divide the unstructured trace record into two or more trace entries based on structural information, the unstructured trace record logically divided based on a boundary indicator associated with a logical field indicator provided by one or more parameters;

dynamically applying a query expression comprising a condition and the one or more parameters to each entry;

assembling each trace entry that satisfies the query expression into an abridged trace record; and presenting the abridged trace record to a user.

* * * * *